Patented Aug. 15, 1950

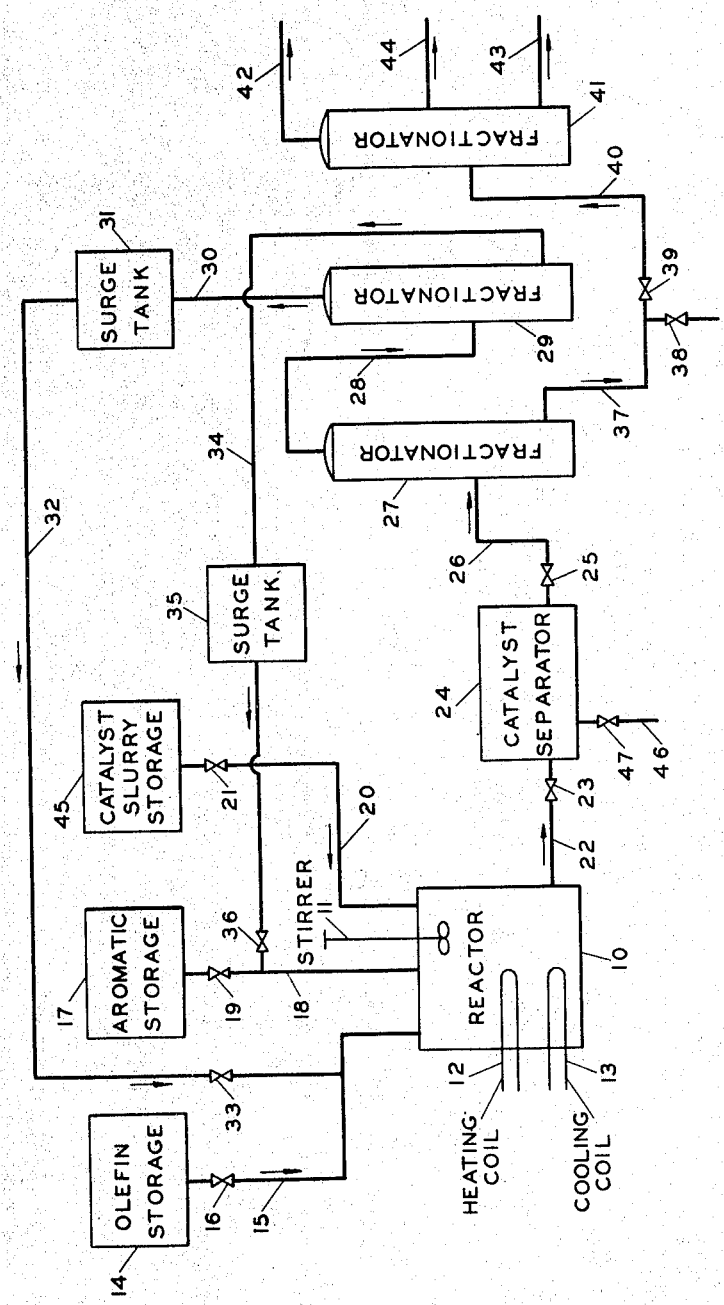

2,519,099

UNITED STATES PATENT OFFICE 2,519,099

PREPARATION OF ALKYL-AROMATIC COMPOUNDS

Grant C. Bailey, Royal Oak, Mich., and James A. Reid, Bartlesville, Okla., assignors to Phillips Petroleum Company, a corporation of Delaware Application November 28, 1947, Serial No. 788,630

17 Claims. (Cl. 260—671)

This invention relates to alkyl-aromatic hydrocarbon compounds. In one of its more specific aspects it relates to a method for preparing alkyl substitution products of aromatic compounds. In a still more specific aspect it relates to a method for the preparation of alkyl substitution products of aromatic hydrocarbons in which the alkyl groups have a greater number of carbon atoms than the olefinic hydrocarbons charged to the process.

The conversion of olefinic hydrocarbons to polymers or other compounds having molecular weights higher than the molecular weight of the original olefinic hydrocarbon in the presence of a catalyst is a reaction which is well known in the art. Catalysts most frequently used for reactions of this type have been the metal halides, such as aluminum or zinc chloride, boron trifluoride, or such acids as sulfuric or phosphoric. These catalysts are active not only for polymerization but also for isomerization and other side reactions, so that simple linear polymers are frequently not obtained. In our patent, No. 2,381,198, issued August 7, 1945, we have shown that the use of a nickel oxide catalyst promotes polymerization of aliphatic olefins into simple polymers of low molecular weight, which are, to a large extent, straight chain compounds.

Akylation of hydrocarbons, including aromatic compounds, has been reported extensively; the most useful catalysts being aluminum chloride, hydrogen fluoride, boron fluoride, sulfuric acid and phosphoric acid. Under certain operating conditions these catalysts frequently promote isomerization, disproportionation and polymerization reactions so that a simple product easily separable from a reaction mixture in a substantially pure form is rarely obtained.

An object of our invention is to devise a process for making an alkyl derivative of an aromatic hydrocarbon in which the alkyl group is more complex than the olefin from which it was produced.

Another object of our invention is to devise a method for making an alkyl derivative of an aromatic compound in which operation the olefinic compounds used are relatively simple and easily available and the alkyl groups of the final compounds are more complex than the starting olefinic compounds.

Still another object of our invention is to devise a process in which ethylene may be used as a base material in the production of alkyl derivatives of aromatic compounds in which the alkyl groups have a greater number of carbon atoms than ethylene.

Still other objects and advantages will be apparent upon reading the following disclosure, when taken in conjunction with the attached drawing, respectively describes and illustrates the process of our invention.

The figure illustrates, diagrammatically, one form of apparatus in which the process of our invention may be carried out.

We have found that alkyl-aromatic compounds can be produced by a new process presumably comprising polymerization followed by alkylation in a one step operation. Specifically, alkyl-aromatic compounds can be produced by the single step of contacting an aliphatic olefin hydrocarbon with an aromatic compound in liquid phase in the presence of a catalyst under suitable operating conditions. The preferred catalyst for promoting this reaction comprises nickel oxide supported on silica-alumina gel. Such a catalyst can be made by the method described in the U. S. Patent, No. 2,381,198, wherein it is taught that the method of preparing such catalytically active nickel oxide catalyst can be, for example, either by decomposing a nickel salt such as nickel nitrate or carbonate to the nickel oxide at a temperature within the range of 400 to 700° C. for a length of time of one-half to 12 hours or by heating a nickel oxide to a temperature within this range for a length of time of one-half to 12 hours after the decomposition has been completed at a lower temperature. Preferably, treatment of the catalyst within the above-specified temperature range is conducted in the presence of an oxygen-containing atmosphere.

By selecting suitable operating conditions, it is possible to secure, for example, a butyl derivative of aromatic compounds directly by using ethylene as the charge olefin without the necessity of preparing and purifying butylene for use in the alkylation step. Furthermore, if the proper operating conditions are chosen it is usually possible to obtain the major portion of the reaction product as a single component with only minor proportions of other compounds as impurities, to vary the proportions of homologues in the product, and to obtain as reaction products compounds which have one or more than one alkyl group substituted in the aromatic nucleus.

One advantage of the process is its flexibility which permits rapid conversion from the manufacture of one compound to another by merely changing operating conditions or by changing the reactants, with no changes in apparatus. Another advantage is that there is little or no reconstruction of the alkyl groups; hence, a series of products may be formed which vary from the other in chain length by the number of carbons in the olefin monomer which is a minimum of two. For the lower molecular weight products the boiling points are fairly well separated and the compounds can be readily separated and purified by fractionation. If desired, any olefins remaining may be removed by chemical or other means.

A modification of this process consists in using more than one olefin in the charge to obtain an alkyl substituent the length of which is not a simple multiple of any one olefin but the sum of the particular olefin groups reacting. In another modification polysubstituted alkyl-aromatic compounds may be produced.

The temperature of reaction may be varied over a wide range, depending upon the product desired. To produce butyl derivatives of benzene and toluene from ethylene and the desired aromatic compound a temperature of approximately 100 to 300° C. is satisfactory with a preferred temperature of 225 to 250° C. Pressure may be from about 100 to 1000 pounds per square inch but may be varied beyond these limits to suit particular conditions.

A preferred embodiment of our invention will be described in connection with the figure. Into a pressure reaction chamber 10 equipped with a stirrer 11, some heating coils 12 and cooling coils 13, may be introduced the olefin charge stock from a storage tank 14 through a pipe 15 controlled by a valve 16. Aromatic feed, in inert solvent, as desired, may be introduced from a storage tank 17 through a pipe 18 controlled by a valve 19. Catalyst, suspended in aromatic feed may be introduced from a storage tank 45 through a pipe 20 controlled by a valve 21. The reactants are supplied to the reaction chamber by proportioning pumps or other suitable means, not shown. The reaction mixture may be heated or cooled as found necessary by the heating or cooling coils 12 or 13. During the time the reactants are in the reaction chamber the concomitant processes of polymerization and alkylation take place. When reaction is complete the reaction mixture may be discharged from the reactor 10 through an outlet pipe 22 controlled by a valve 23 to a separator 24 in which the nickel oxide catalyst is separated by settling, filtering, or other suitable means. The spent catalyst may be removed through a pipe 46 controlled by a valve 47, and the reaction mixture passed through a pipe 25 controlled by a valve 26 to a fractionator 27. The lower molecular weight olefins, unalkylated aromatic compounds and inert solvent, if any, may be removed overhead from the fractionator 27 through a pipe 28 and further separated if desired, in a fractionator 29 into lighter olefins as overhead product, and heavier olefins and unalkylated aromatic compounds as bottoms. At least a portion of the lighter olefins may be led through a pipe 30, a surge tank 31 and a pipe 32 controlled by a valve 33 and recycled to the reactor 10. At least a portion of the heavier olefins and unalkylated aromatics may be led through a pipe 34, into a surge tank 35 and, controlled by a valve 36, to the reactor 10; or the heavier olefin and unalkylated aromatic stream may be purified by additional physical or chemical means, not shown, before recycling the desired portion. The alkylated product from the fractionator 27 may be led through a pipe 37 and a valve 38 if the product needs no additional purification or it may be led through a valve 39 and a pipe 40 to a fractionator 41 and desired products removed as overhead through a pipe 41, bottoms through a pipe 43 and a side stream through a pipe 44 to such disposals as desired and not shown herein for purposes of simplicity.

The following examples will illustrate the method of carrying out our invention and will further illustrate the type of products obtainable.

*Example I*

The catalyst used in the following examples was nickel oxide on a silica-alumina gel support. This gel support was made by impregnating a wet, newly prepared silica gel with a solution of an aluminum salt to effect activation of the silica gel, washing the activated gel, and drying, as disclosed in U. S. Patents 2,142,325, 2,147,985, 2,342,196 and 2,349,904.

The catalyst support so prepared was soaked in nickel nitrate and dried. This raw catalyst was then activated for use by heating in air at 500° C. for 1.5 hours. The amount of nickel oxide present on the catalyst was equivalent to 1.5% of metallic nickel as determined by analytical methods.

A volume of 400 ml. of benzene was charged to the reactor and 69.7 grams of finely divided activated nickel oxide catalyst was added. The reactor was closed and pressured with ethylene gas from a cylinder of ethylene of commercial grade to a pressure of about 400 pounds per square inch gage at an operating temperature of 110° C. and maintained at these conditions for 3.25 hours. The reactor was then cooled to ice temperature and the exit tube was chilled to −75° C., which chilling liquefied all the reaction mixture except the unconsumed ethylene. On fractionation of the reaction mixture the following products, free of charge materials, were obtained:

| Compound: | Per cent by volume |
|---|---|
| s-butylbenzene | 7.1 |
| hexylbenzene | 3.1 |
| 1-butene | 69.6 |
| hexene | 8.8 |
| octene | 6.3 |
| decene | 3.0 |
| dodecene | 1.4 |
| ethylbenzene | 0.7 |
| | 100.0 |

*Example II*

The same reactor and reactants with 68.3 grams of the catalyst prepared as described in Example I were used. The pressure was maintained at 400 p. s. i. g., the temperature at 175° C. and the time was 2.75 hours. The products freed of charge material were as follows:

| Compound: | Per cent by volume |
|---|---|
| s-butylbenzene | 5.9 |
| hexylbenzene | 10.6 |
| butene | 26.0 |
| hexene | 13.4 |
| octene | 26.8 |
| decene | 5.9 |
| dodecene | 10.6 |
| ethylbenzene | 0.8 |
| | 100.0 |

*Example III*

In an experiment similar to that in the above examples the temperature was 225° C. and the reaction time was 2.25 hours. The products, less the reactants, were as follows:

| Compound: | Per cent by volume |
|---|---|
| s-butylbenzene | 61.6 |
| hexylbenzene | 15.3 |
| octylbenzene | 10.1 |
| decylbenzene | 3.1 |
| ethylbenzene | 9.9 |
| | 100.0 |

*Example IV*

Another run using a similar procedure and the same reactants but a temperature of 260° C., reaction time of 3 hours and a catalyst containing sufficient nickel oxide to contain 5 per cent nickel was made. The reactant-free products were:

| Compound: | Per cent by volume |
|---|---|
| s-butylbenzene | 43.0 |
| ethylbenzene | 41.5 |
| aromatic residue | 15.5 |
| | 100.0 |

*Example V*

Again with ethylene as the olefin charged, toluene was alkylated using a reaction temperature of 175° C., time of 3.75 hours and 75 grams of the 1.5 per cent nickel-oxide catalyst. The products are as follows:

| Compound: | Per cent by volume |
|---|---|
| s-butyltoluene | 37.6 |
| hexyltoluene | 4.0 |
| 1-butene | 24.4 |
| hexene | 17.3 |
| octene | 1.0 |
| decene | 8.3 |
| aromatic residue | 7.4 |
| | 100.0 |

A modification of this process may be made by substituting a granular fixed-bed catalyst in the reactor 10 instead of the fine slurry storage tank 45, valve 21, feed pipe 20, and stirrer 11, and the catalyst separator 24 may be eliminated. However, when fixed-bed catalyst is used the reactor 10 may actually be two or more vessels, and one being on stream while another is being recharged or reactivated and so forth.

Apparatus commercially available may be used in the construction of a plant for carrying out our process. No especially corrosive resistant equipment is ordinarily necessary since no acids nor other corroding materials are used in the process.

The inert solvent or diluent used with the aromatic feed stock may be, for example, n-hexane, n-heptane, or the like. However, it is preferable to use a material which boils at about the same temperature or a little higher than the boiling point of the aromatic compound being alkylated.

Many other modifications and variations of the preferred embodiment of our invention will become apparent to those skilled in the art for the production of particular alkylated aromatic compounds. The essential features are believed to be the concomitant polymerization of an olefin and the alkylation of an aromatic compound with the polymerized olefin in the presence of a catalyst in a single stage of operation. However, we do not wish to limit ourselves to this possible mechanism of operation since we are not certain exactly what reactions and in what order reactions occur in the reactor vessel 10. We wish to be limited only by the appended claims.

We claim:

1. A process for producing an alkyl-aromatic hydrocarbon compound in a single step comprising contacting a polymerizable aliphatic olefin hydrocarbon and a mononuclear alkylatable aromatic hydrocarbon in the presence of a catalyst comprising nickel-oxide and silica-alumina under polymerization and alkyation reaction conditions of temperature and pressure such that an alkyl-aromatic hydrocarbon is produced in which the alkyl radical has a greater number of carbon atoms than said aliphatic olefin hydrocarbon.

2. A process for producing an alkyl-aromatic hydrocarbon compound in a single step comprising contacting a polymerizable aliphatic olefin hydrocarbon and a mononuclear alkylatable aromatic hydrocarbon in the presence of a catalyst comprising nickel-oxide and silica-alumina under polymerization and alkylation reaction conditions of temperature and pressure such that an alkyl-aromatic hydrocarbon is produced in which the number of carbon atoms in the alkyl group is a simple multiple of the number of carbon atoms per molecule in the aliphatic olefin hydrocarbon charged.

3. The process of claim 2 in which the aliphatic olefin hydrocarbon contains 2 to 4 carbon atoms per molecule.

4. A process for producing an alkyl-aromatic hydrocarbon compound from a polymerizable aliphatic olefin hydrocarbon and an alkylatable aromatic hydrocarbon, in which the alkyl radical of the compound has a larger number of carbon atoms than the aliphatic olefin hydrocarbon comprising contacting an aliphatic olefin hydrocarbon and an aromatic hydrocarbon selected from the group consisting of benzene and alkyl-substituted benzenes in the presence of a catalyst comprising nickel-oxide supported on silica-alumina gel at a temperature between the approximate limits of 100° to 300° C. and at a superatmospheric pressure, and recovering the alkyl-aromatic hydrocarbon compound.

5. The process of claim 4 in which the aliphatic olefin hydrocarbon contains 2 to 4 carbon atoms per molecule.

6. The process of claim 4 in which the aromatic hydrocarbon is toluene.

7. The method of claim 4 wherein the aliphatic olefin hydrocarbon is ethylene and the aromatic hydrocarbon is benzene.

8. A process for producing secondary butyl benzene comprising contacting ethylene with benzene at a temperature within the approximate limits of 100° to 300° C. in the presence of a nickel oxide catalyst carried on a silica-alumina gel support, and at a superatmospheric pressure, and recovering the secondary butyl benzene.

9. The process of claim 8 wherein the ethylene and benzene are contacted in the presence of said catalyst at a temperature of approximately 225° C.

10. A process for producing an alkyl-aromatic hydrocarbon compound from aliphatic olefin hydrocarbons and an aromatic hydrocarbon comprising contacting a mixture of aliphatic olefin hydrocarbons having 2 to 4 carbon atoms per molecule with benzene in the presence of a nickel oxide catalyst on a silica-alumina gel support at a temperature between the approximate limits of 100° to 300° C. at a superatmospheric pressure, and recovering an alkyl-aromatic hydrocarbon compound in which the number of carbon atoms in the alkyl radical is the sum of the carbon atoms in the olefin groups reacting.

11. A process for producing an alkyl-aromatic hydrocarbon compound from a polymerizable aliphatic olefin hydrocarbon and an alkylatable aromatic hydrocarbon, in which the alkyl radical of said compound has a larger number of carbon atoms than the said olefin hydrocarbon which comprises contacting an aliphatic monoolefin hydrocarbon and an aromatic hydrocarbon selected from the group consisting of benzene and alkyl-substituted benzenes in the presence of a catalyst comprising nickel-oxide supported on a silica-alumina gel at a temperature between 100° and 300° C. and at a superatmospheric pressure.

12. A process for producing an alkyl-aromatic hydrocarbon compound from polymerizable aliphatic olefin hydrocarbons and an alkylatable aromatic hydrocarbon, in which the alkyl radical has a larger number of carbon atoms than the said olefin hydrocarbon molecules which comprises contacting a mixture of aliphatic monoolefin hydrocarbons and an aromatic hydrocarbon selected from the group comprising benzene and alykyl-substituted benzene in the presence of a catalyst comprising nickel-oxide supported on a silica-alumina gel at a temperature between 100° and 300° C. and at a superatmospheric pressure.

13. The process of claim 12 wherein the said olefinic hydrocarbons comprise a mixture of at least two olefinic hydrocarbons selected from the group consisting of ethylene, propylene and butylene.

14. A process for producing an alkyl-aromatic hydrocarbon compound from a polymerizable aliphatic olefin hydrocarbon and an alkylatable aromatic hydrocarbon, in which the alkyl radical has a larger number of carbon atoms than said olefin hydrocarbon molecule which comprises contacting an aliphatic monoolefin hydrocarbon and an aromatic hydrocarbon selected from the group consisting of benzene and alkyl-substituted benzenes in the presence of a catalyst comprising nickel-oxide supported on a silica-alumina gel at a temperature between 100 and 300° C. and at a superatmospheric pressure, said catalyst having been previously heated to a temperature within the range of 400° to 700° C. for a period of time within the range of one-half to 12 hours.

15. The process of claim 14 wherein said previous heating of said catalyst is conducted in the presence of an oxygen-containing atmosphere.

16. The process of claim 15 wherein said catalyst is prepared by decomposing nickel nitrate impregnated on silica-alumina gel.

17. The process of claim 14 wherein said monoolefin hydrocarbon is ethylene and said aromatic hydrocarbon is benzene.

GRANT C. BAILEY.
JAMES A. REID.

REFERENCES CITED

The following references are of record in the file of this patent:

UNITED STATES PATENTS

| Number | Name | Date |
|---|---|---|
| 2,381,198 | Bailey | Aug. 7, 1945 |
| 2,419,599 | Schulze | Apr. 29, 1947 |
| 2,419,796 | Schulze | Apr. 29, 1947 |